United States Patent
Kinney

(10) Patent No.: US 12,252,060 B2
(45) Date of Patent: Mar. 18, 2025

(54) CARGO STRAP SECURING ASSEMBLY

(71) Applicant: Jonathan Kinney, Saugus, CA (US)

(72) Inventor: Jonathan Kinney, Saugus, CA (US)

( * ) Notice: Subject to any disclaimer, the term of this patent is extended or adjusted under 35 U.S.C. 154(b) by 0 days.

(21) Appl. No.: 18/226,475

(22) Filed: Jul. 26, 2023

(65) Prior Publication Data

US 2025/0033551 A1    Jan. 30, 2025

(51) Int. Cl.
*B60P 7/08* (2006.01)
(52) U.S. Cl.
CPC .................. *B60P 7/0853* (2013.01)
(58) Field of Classification Search
CPC ......... B60P 7/0807; B60P 7/0815; B60P 7/08; B60P 7/0823; Y10T 24/2175; Y10T 24/4773; F16B 21/065; F16B 21/06
See application file for complete search history.

(56) References Cited

U.S. PATENT DOCUMENTS

| | | | | |
|---|---|---|---|---|
| 937,669 | A * | 10/1909 | Wheeler | B62D 33/02 296/34 |
| 4,026,218 | A * | 5/1977 | Prete, Jr. | B60P 7/0815 410/104 |
| 5,516,245 | A * | 5/1996 | Cassidy | B60P 7/15 410/97 |
| D446,442 | S * | 8/2001 | Simpson | D8/354 |
| 6,523,800 | B2 * | 2/2003 | Hsu | B60P 7/0823 248/500 |
| 6,565,300 | B2 * | 5/2003 | Herring | B60P 7/0815 410/108 |
| 6,592,310 | B2 * | 7/2003 | Hyp | B60P 7/0807 296/65.13 |
| 6,712,568 | B2 * | 3/2004 | Snyder | B60P 7/0815 410/112 |
| 6,969,219 | B2 * | 11/2005 | Speece | B60P 7/0807 410/106 |
| 7,040,849 | B2 * | 5/2006 | Cunningham | B60P 7/0815 410/104 |
| 7,621,706 | B2 * | 11/2009 | Early | B60P 7/0807 410/116 |
| 7,913,977 | B2 * | 3/2011 | Kaczorowski | B25B 25/00 254/218 |

(Continued)

FOREIGN PATENT DOCUMENTS

WO    WO2019226981    11/2019
WO    WO-2019226981 A1 *    11/2019    ............ B60P 7/0807

OTHER PUBLICATIONS

Snap-Loc Logistic E-Fitting Snap-Hook, Grainger, https://www.grainger.com/product/SNAP-LOC-Logistic-E-Fitting-Snap-Hook-19XZ81 (Year: 2016).*

*Primary Examiner* — Jason W San
*Assistant Examiner* — Anna S Rashid

(57) ABSTRACT

A cargo strap securing assembly includes a pair of track anchors that is each insertable into a respective one of an adjacent pair of attachment holes in a cargo track. A locking lever is pivotally coupled between the pair of track anchors and the locking lever is biased into a locking condition for retaining the cargo track in each of the engagement elements. The locking lever is urgeable into an unlocked condition to facilitate the cargo track to be removed from the engagement elements. A retainer is coupled to and extends upwardly from the pair of track anchors and a D-ring extends through the retainer thereby facilitating a cargo strap to be attached to the D-ring.

11 Claims, 9 Drawing Sheets

(56) References Cited

U.S. PATENT DOCUMENTS

| | | | |
|---|---|---|---|
| 8,376,675 B2* | 2/2013 | Schulze | B64D 9/003 |
| | | | 410/104 |
| 8,469,643 B2* | 6/2013 | Early | B61D 45/001 |
| | | | 410/116 |
| 8,690,502 B1* | 4/2014 | Huang | B60P 7/0823 |
| | | | 410/101 |
| 8,740,524 B2* | 6/2014 | Schulze | B60P 7/0807 |
| | | | 410/104 |
| 9,045,070 B2* | 6/2015 | Pauluk | B29C 45/16 |
| 9,751,450 B1* | 9/2017 | Zhou | B60P 7/083 |
| 10,023,097 B1* | 7/2018 | Harris | B60P 7/0807 |
| 10,065,554 B1* | 9/2018 | Xia | B60P 7/083 |
| 10,093,220 B2* | 10/2018 | Dellock | B60P 7/0807 |
| 10,118,674 B1* | 11/2018 | Jeffrey | B60P 7/0823 |
| 10,131,523 B2* | 11/2018 | Smetz | B66C 1/66 |
| 10,179,651 B2* | 1/2019 | Olulana | B64D 11/064 |
| 10,266,098 B1* | 4/2019 | Cox | B32B 7/12 |
| 10,576,868 B1* | 3/2020 | Gilmour | B60P 7/0815 |
| 10,800,340 B1* | 10/2020 | Mayville | B60R 9/06 |
| 10,800,528 B1* | 10/2020 | Williams | B60P 7/0807 |
| 11,097,645 B2* | 8/2021 | Buczynski | B60P 7/0807 |
| 11,129,448 B1* | 9/2021 | Cretikos | A44B 11/12 |
| 11,292,382 B2* | 4/2022 | Johnson | B60P 7/0807 |
| 11,464,335 B2* | 10/2022 | Brunner | A47F 5/0846 |
| 11,524,619 B2* | 12/2022 | McCormack | B60P 7/0807 |
| 2002/0084338 A1* | 7/2002 | Hyp | B60P 7/0807 |
| | | | 238/315 |
| 2002/0145300 A1* | 10/2002 | Webber | B62D 33/0273 |
| | | | 296/61 |
| 2002/0164225 A1* | 11/2002 | Snyder | B60P 7/0815 |
| | | | 410/104 |
| 2002/0171022 A1* | 11/2002 | Hsu | B60R 7/02 |
| | | | 248/505 |
| 2004/0131439 A1* | 7/2004 | Womack | B60P 7/0815 |
| | | | 410/104 |
| 2005/0036848 A1* | 2/2005 | Cunningham | B60R 9/058 |
| | | | 410/104 |
| 2005/0079026 A1* | 4/2005 | Speece | B60P 7/0807 |
| | | | 410/106 |
| 2005/0242255 A1* | 11/2005 | Sturt | B60R 11/00 |
| | | | 248/304 |
| 2005/0247234 A1* | 11/2005 | Early | B60P 7/0807 |
| | | | 105/362 |
| 2007/0085378 A1* | 4/2007 | Hanson | B60R 13/01 |
| | | | 296/183.1 |
| 2007/0116536 A1* | 5/2007 | Bleicher | B60P 7/13 |
| | | | 410/96 |
| 2007/0289112 A1* | 12/2007 | Kaczorowski | B25B 25/00 |
| | | | 24/68 CD |
| 2008/0169395 A1* | 7/2008 | Bullock | F16B 45/00 |
| | | | 248/304 |
| 2009/0324357 A1* | 12/2009 | Early | B60P 7/0807 |
| | | | 410/107 |
| 2010/0316460 A1* | 12/2010 | Schulze | B60P 7/0807 |
| | | | 410/104 |
| 2018/0272916 A1* | 9/2018 | Xia | B60P 7/083 |
| 2021/0115958 A1* | 4/2021 | Blum | F16B 21/02 |
| 2022/0089226 A1* | 3/2022 | Henning | B62D 33/04 |
| 2023/0220861 A1* | 7/2023 | Dickinson | F16B 21/065 |
| | | | 24/445 |

* cited by examiner

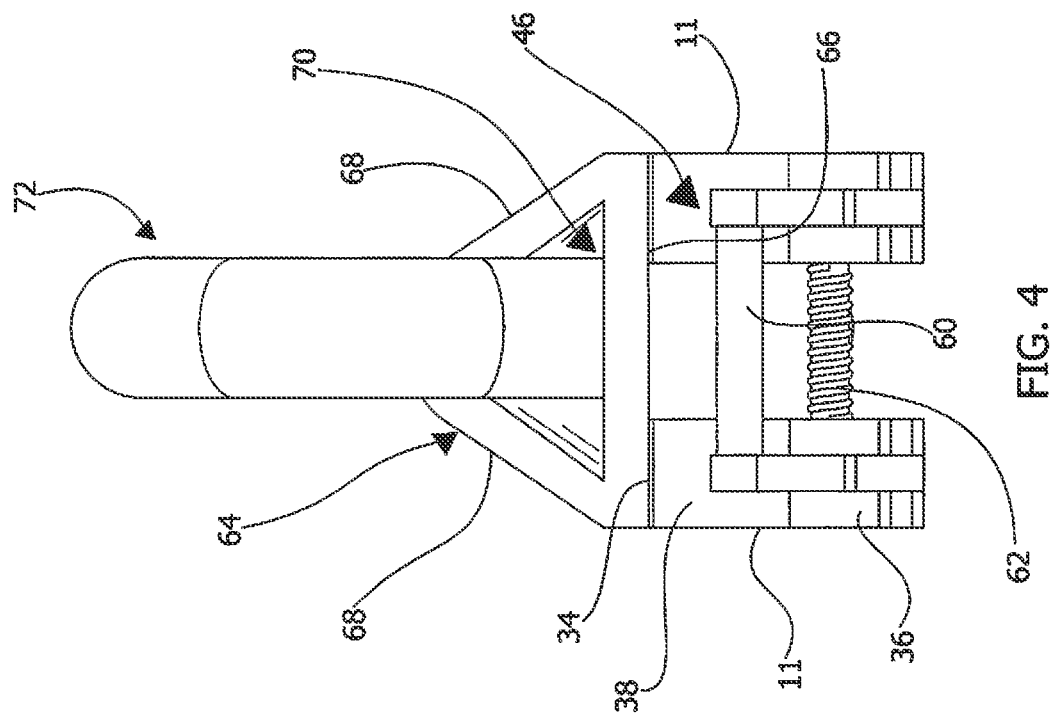
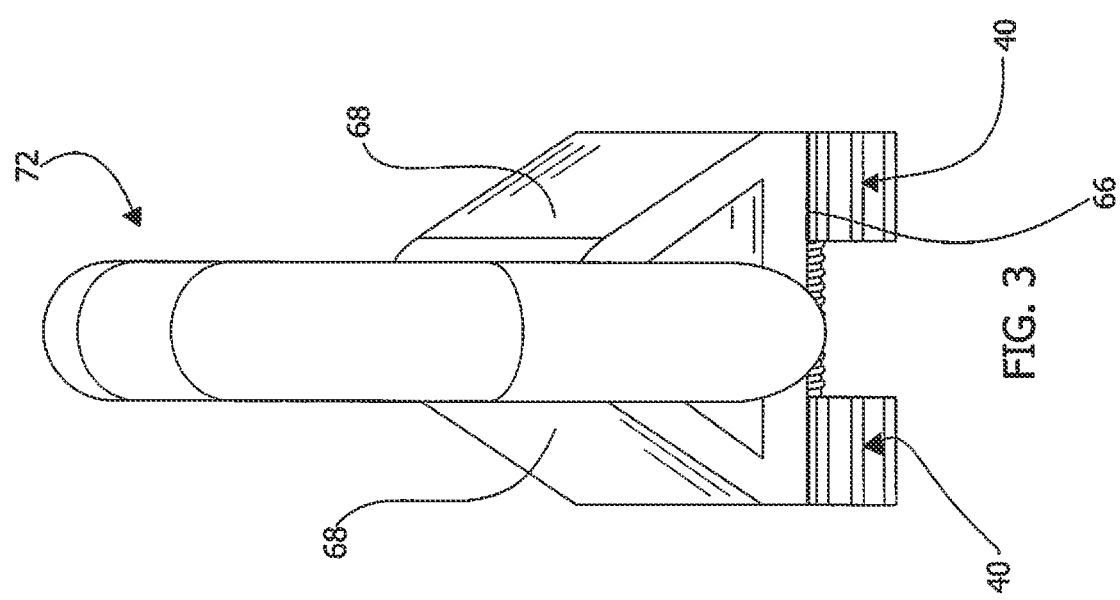

CARGO STRAP SECURING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to cargo securing devices and more particularly pertains to a new cargo securing device for securing a cargo strap to a cargo track of a cargo trailer. The device includes a pair of track anchors that are attached to each other and which are insertable into a respective pair of a plurality of attachment openings in a cargo track. Each of the track anchors includes a locking lever that extends between the pair of track anchors for securing or releasing the track anchors to/from the cargo track and a D-ring attached to the pair of track anchors for attaching a cargo strap to the D-ring.

(2) Description of Related Art Including Information Disclosed Under 37 CFR 1.97 and 1.98

The prior art relates to cargo securing devices including a variety of D-ring devices that each includes a securing device for permanently attaching the D-ring to a support surface and a cargo track device which includes attachment means for routing a cargo strap through a cargo track. In no instance does the prior art disclose a cargo track device that includes a cargo track, a pair of track anchors that releasably engages the cargo track and a locking lever that is attached between the pair of track anchors for releasing the pair of track anchors from the cargo track.

BRIEF SUMMARY OF THE INVENTION

An embodiment of the disclosure meets the needs presented above by generally comprising a pair of track anchors is each insertable into a respective one of an adjacent pair of attachment holes in a cargo track. A locking lever is pivotally coupled between the pair of track anchors and the locking lever is biased into a locking condition for retaining the cargo track in each of the engagement elements. The locking lever is urgeable into an unlocked condition to facilitate the cargo track to be removed from the engagement elements. A retainer is coupled to and extends upwardly from the pair of track anchors and a D-ring extends through the retainer thereby facilitating a cargo strap to be attached to the D-ring.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a back view of an embodiment of the disclosure.

FIG. 4 is a front view of an embodiment of the disclosure.

DETAILED DESCRIPTION OF THE INVENTION

Figure 1:
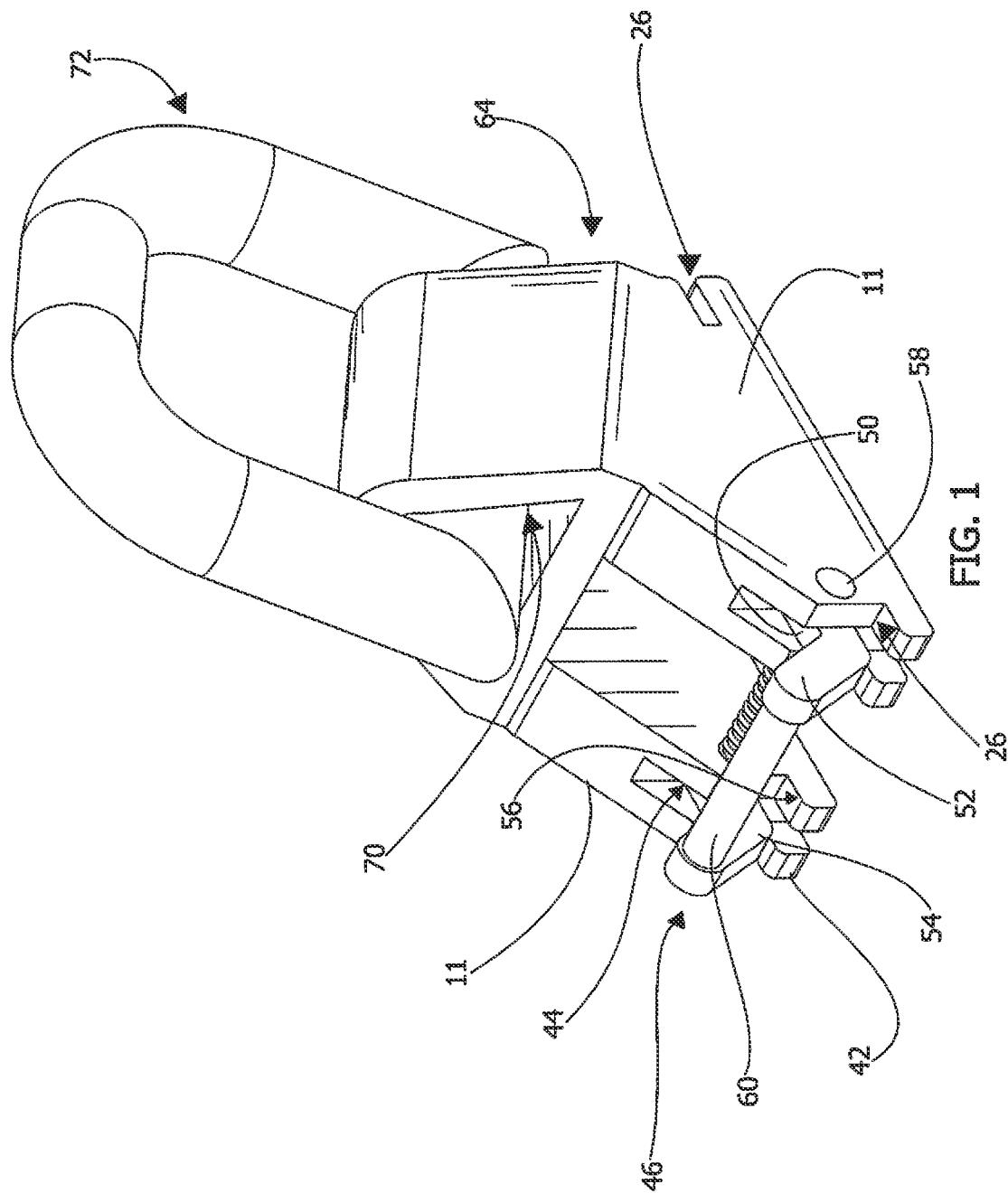
FIG. 1 is a front perspective view of a track anchor of an embodiment of the disclosure.
Figure 2:
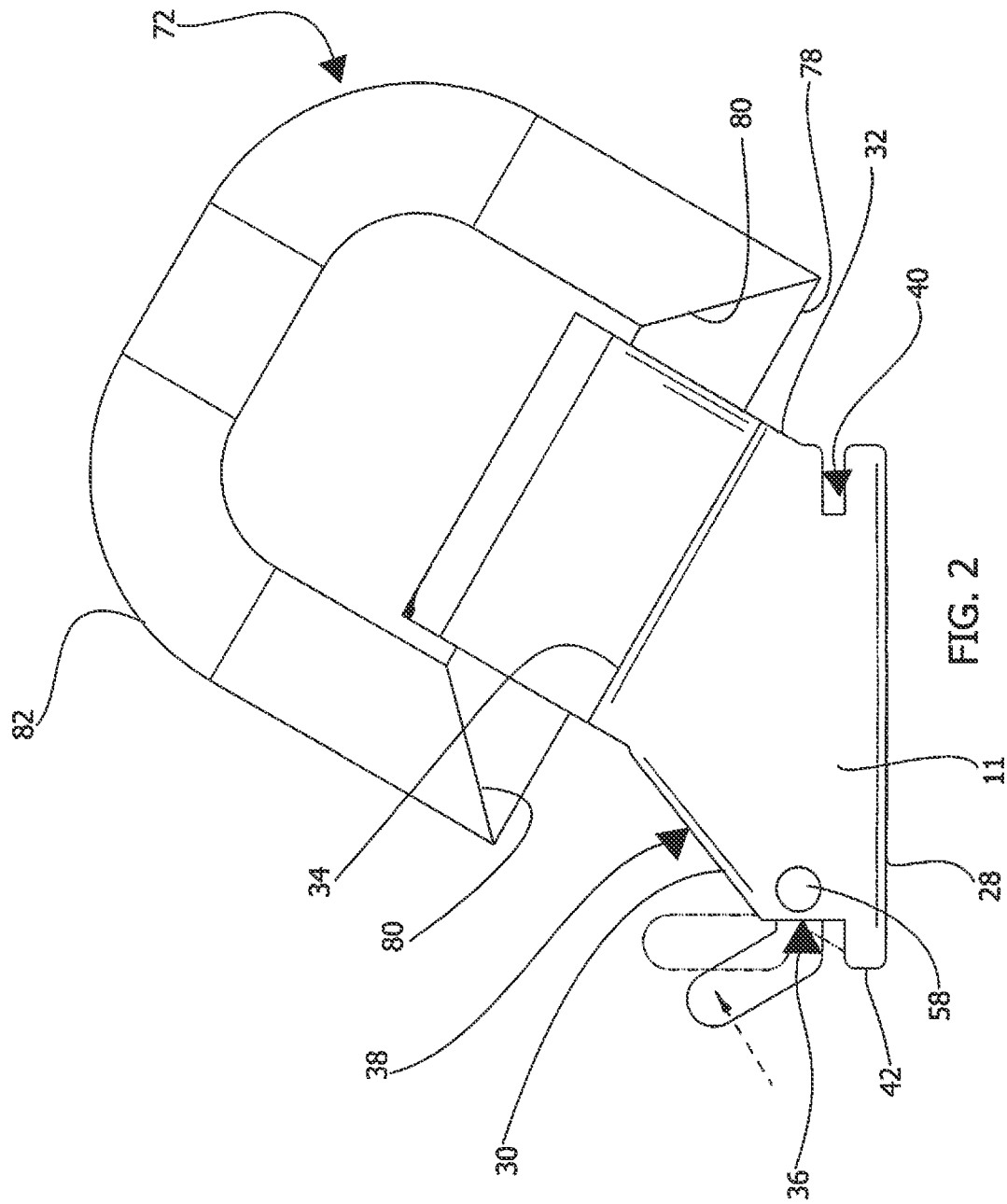
FIG. 2 is a left side view of a track anchor of an embodiment of the disclosure.

With reference now to the drawings, and in particular to FIGS. 1 through 12 thereof, a new cargo securing device embodying the principles and concepts of an embodiment of the disclosure and generally designated by the reference numeral 10 will be described.

As best illustrated in FIGS. 1 through 12, the cargo strap securing assembly 10 generally comprises pair of track anchors 11 that are each engageable to a cargo track 12 that is attached to a cargo trailer 14. The cargo trailer 14 may be a flatbed trailer, a van trailer, a refrigerated trailer or any other type of trailer commonly employed for transporting cargo. Additionally, the cargo track 12 may be an E-track that is commonly employed in the commercial transportation industry. The cargo track 12 has a plurality of attachment holes 16 that are spaced apart from each other and are distributed along a full length of the cargo track 12. Each of the plurality of attachment holes 16 has a bounding edge 18 and the bounding edge 18 has a forward side 20 and a rear side 22. Additionally, each of the plurality of attachment holes 16 is elongated between the forward side 20 and the rear side 22.

Each of the pair of track anchors 11 has a pair of engagement elements 26 that is integrated into the track anchors 11. Each of the pair of track anchors 11 is insertable into a respective one of an adjacent pair of the attachment holes 16 in the cargo track 12. In this way each of the engagement elements 26 in each of the pair of track anchors 11 receives the cargo track 12 for retaining each of the track anchors 11 in the respective engagement element 26. Each of the track anchors 11 has a bottom side 28, a front side 30, a back side 32 and a top side 34. The front side 30 of each of the track anchors 11 has a first portion 36 that is perpendicularly oriented with the bottom side 28 and a second portion 38 angling rearwardly between the first portion 36 and the top side 34. Additionally, the top side 34 slopes downwardly between the second portion 38 and the back side 32.

The back side 32 has a back slot 40 extending toward the front side 30 such that the back slot 40 defines a respective one of the engagement elements 26. The back slot 40 is positioned closer to the bottom side 28 than the top side 34 and the back slot 40 insertably receives the rear side 22 of the bounding edge 18 of the respective pair of attachment holes 16. The front side 30 of each of the track anchors 11 has a foot 42 extending forwardly from the first portion 36 of the front side 30 and the foot 42 is aligned with the bottom side 28. The front side 30 of each of the track anchors 11 has a front slot 44 extending toward the back side 32 and the front slot 44 additionally extends through the foot 42 on the front side 30. Each of the pair of track anchors 11 may comprise an E-track anchor that is commonly employed in conjunction with E-track cargo tracks.

A locking lever 46 is provided and the locking lever 46 is pivotally coupled between the pair of track anchors 11. The locking lever 46 defines a respective one of the engagement elements 26 in each of the track anchors 11. The locking lever 46 is biased into a locking condition for retaining the cargo track 12 in each of the engagement elements 26. Conversely, the locking lever 46 is urgeable into an unlocked condition to facilitate the cargo track 12 to be removed from the engagement elements 26.

The locking lever 46 includes a pair of locks 48 which each includes a first lobe 50 that is oriented at an angle with a second lobe 52. The first lobe 50 associated with each of the locks 48 extends into the front slot 44 in the front side 30 of a respective one of the track anchors 11. Furthermore, the first lobe 50 associated with each of the locks 48 is spaced above the foot 42 on the front side 30 of the respective track anchor 24 and the second lobe 52 associated with each of the track anchors 11 angles upwardly and forwardly on the front side 30. A lower edge 54 of the first lobe 50 lies on a plane oriented parallel to a top surface 56 of the foot 42 when the locks 48 are in a locked position. In this way the forward side 20 of the bounding edge 18 of the respective attachment hole 16 can be positioned between the first lobe 50 and the foot 42. The first lobe 50 angles upwardly from the foot 42 having the second lobe 52 being directed toward the second portion 38 of the front side 30 of the respective track anchor 24 when the locks 48 are in an unlocked position.

The locking lever 46 includes a pin 58 which extends through each of the anchor locks 48 and through the first lobe 50 associated with each of the locks 48 for pivotally retaining each of the locks 48 in the front slot 44 in the front side 30 of the respective track anchor 24. The locking lever 46 includes a bar 60 which extends between the second lobe 52 associated with each of the locks 48 thereby facilitating the bar 60 to be manipulated to urge locks 48 into the unlocked position. The locking lever 46 includes a biasing member 62 that is wrapped around the pin 58. The biasing member 62 biases the pin 58 to rotate in a first direction thereby biasing the locks 48 into the locked position. Conversely, the pin 58 is rotatable in a second direction when the bar 60 is urged upwardly to urge the locks 48 into the unlocked position.

A retainer 64 is coupled to and extends upwardly from the pair of track anchors 11. The retainer 64 includes a lower panel 66 and a pair of outward panels 68 each angling toward each other from the lower panel 66 such that the retainer 64 defines a tunnel 70 which has a triangular shape. The lower panel 66 is bonded to the top side 34 of each of the pair of track anchors 11 such that the tunnel 70 is oriented to extend along an axis extending between the front side 30 and the back side 32 of each of the track anchors 11. A D-ring 72 is provided which extends through the retainer 64 such that the D-ring 72 is attached to the pair of track anchors 11. In this way a cargo strap 74 can be attached to the D-ring 72 for tightening the cargo strap 74 around cargo 76 that is positioned on the cargo trailer 14 to secure the cargo 76 on the cargo trailer 14. The D-ring 72 has a first member 78 extending between opposing ends 80 of a second member 82 which is curved into a U-shape. Additionally, the first member 78 extends through the tunnel 70 defined by the pair of outward panels 68 of the retainer 64 thereby facilitating the cargo strap 74 to be attached to the second member 82.

Figure 5:
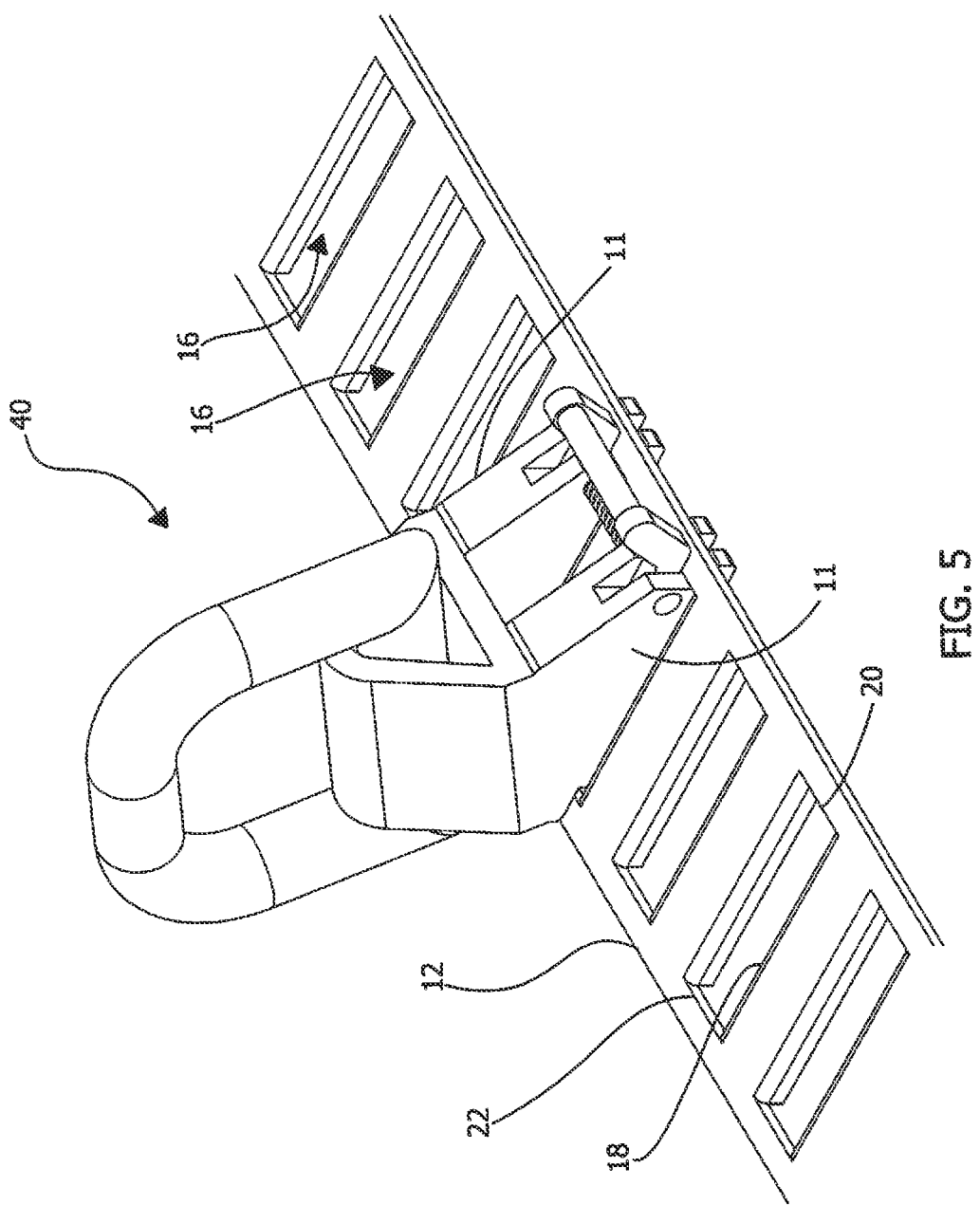
FIG. 5 is a back perspective view of an alternative embodiment of the disclosure.
Figure 7:
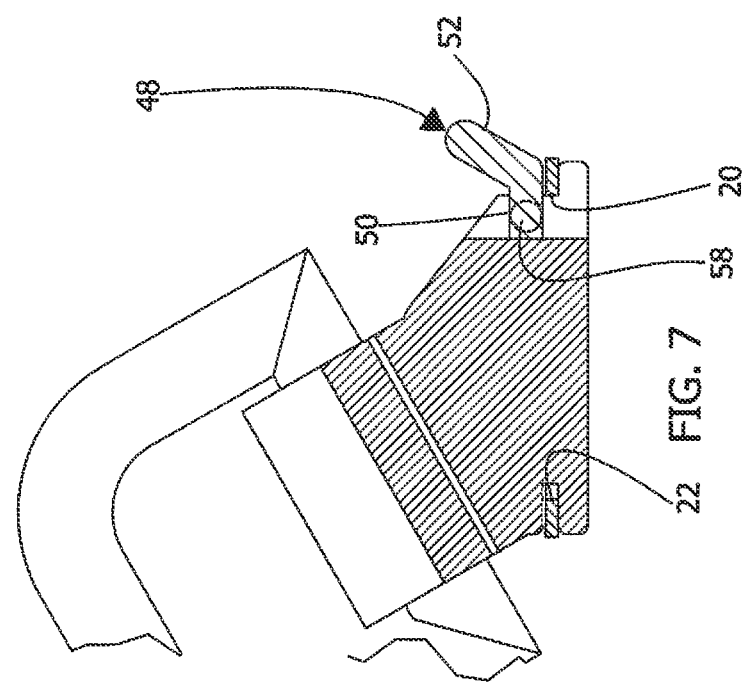
FIG. 7 is a back perspective view of an alternative embodiment of the disclosure showing an alternative mounting of a retainer.
Figure 6:
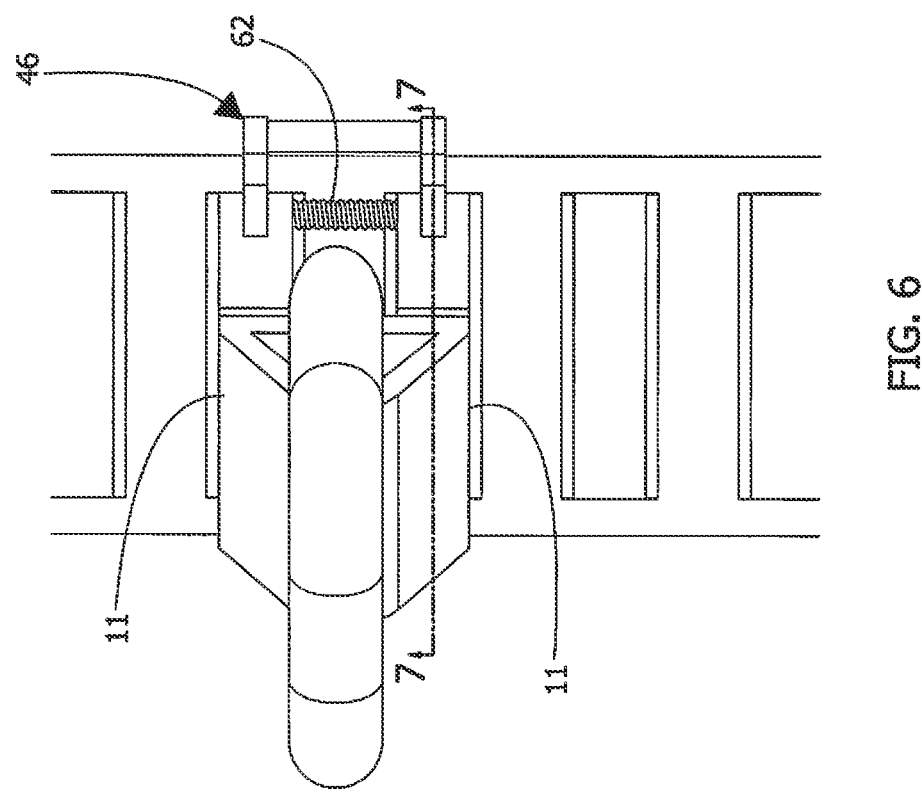
FIG. 6 is a perspective view of an alternative embodiment of the disclosure.
Figure 8:
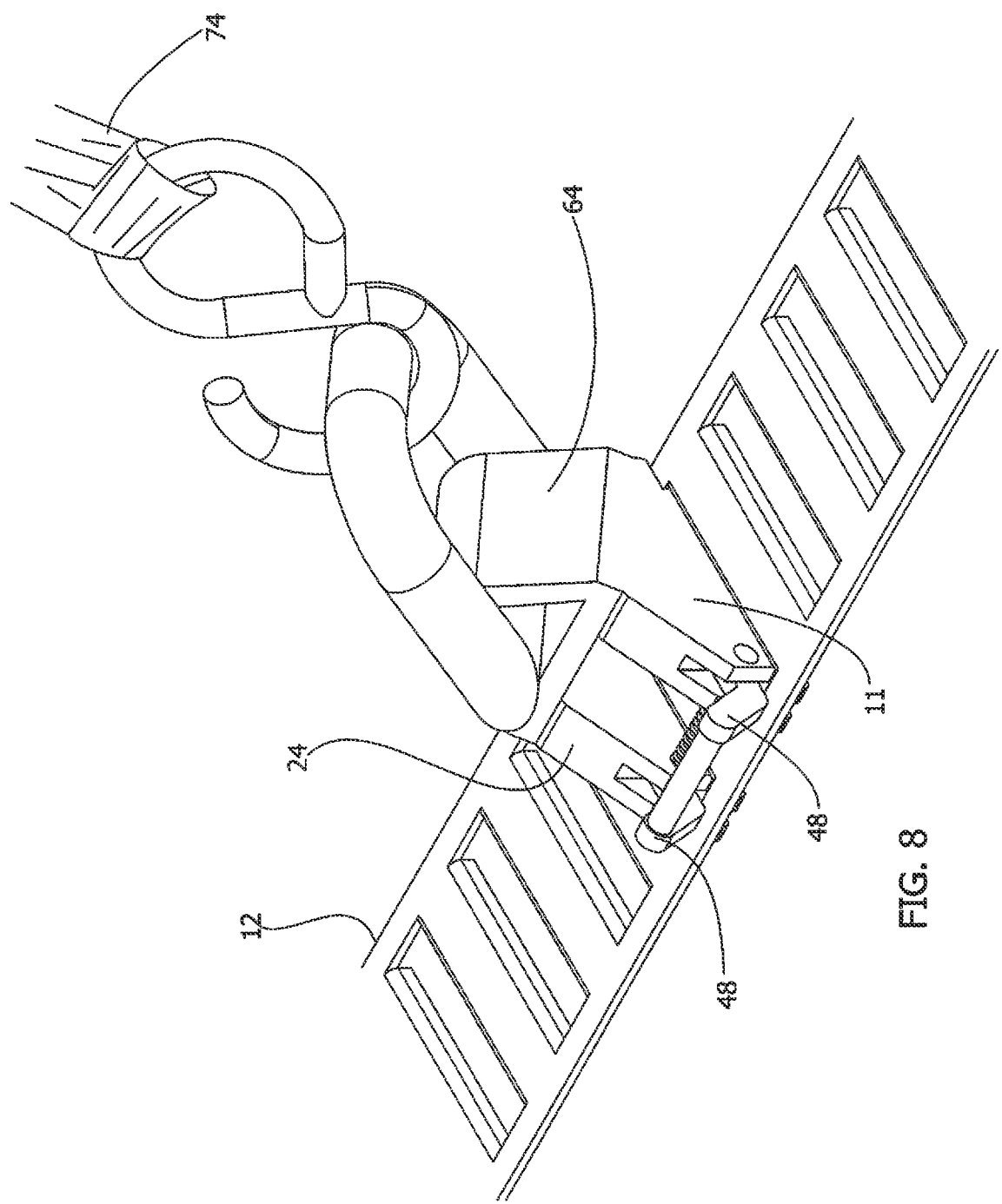
FIG. 8 is a perspective view of a cargo strap securing assembly according to an embodiment of the disclosure.
Figure 9:
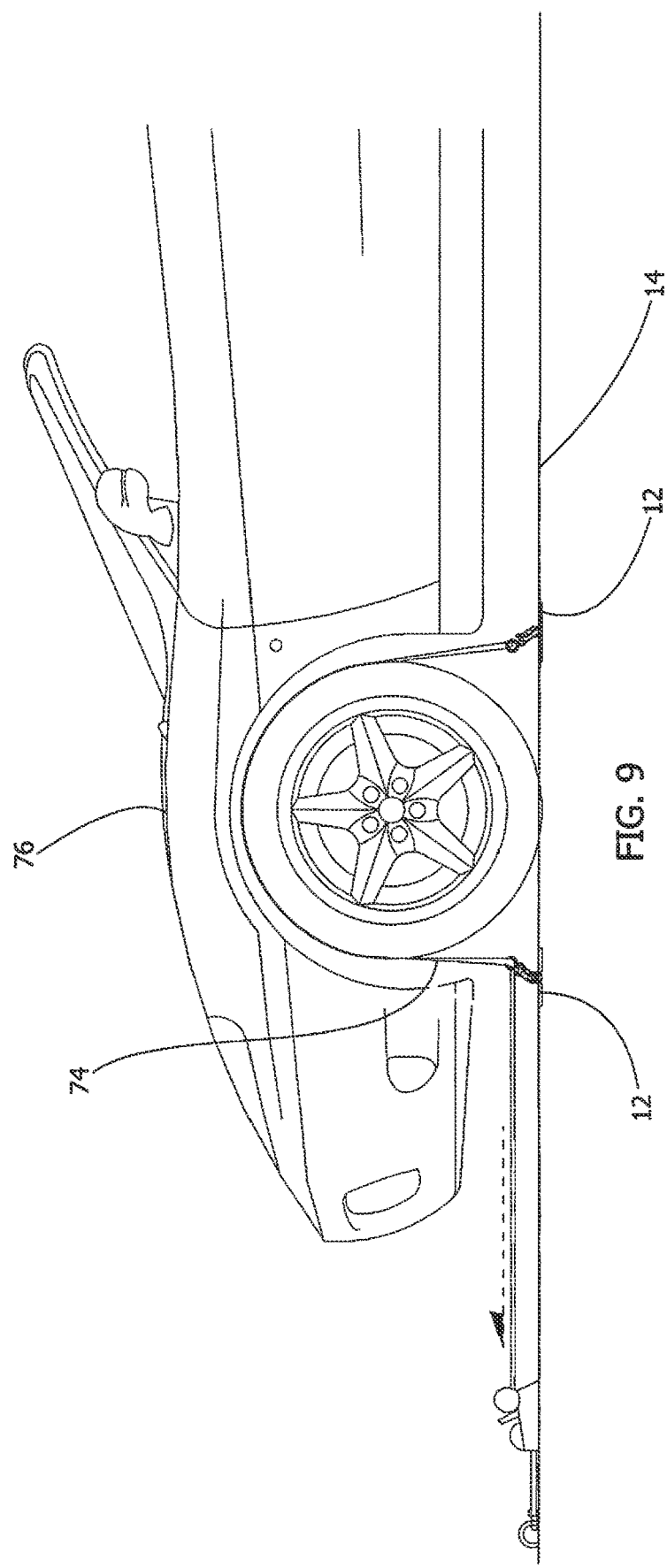
FIG. 9 is a top in-use view of an embodiment of the disclosure showing a pair of track anchors attached to a cargo rail.
Figure 11:
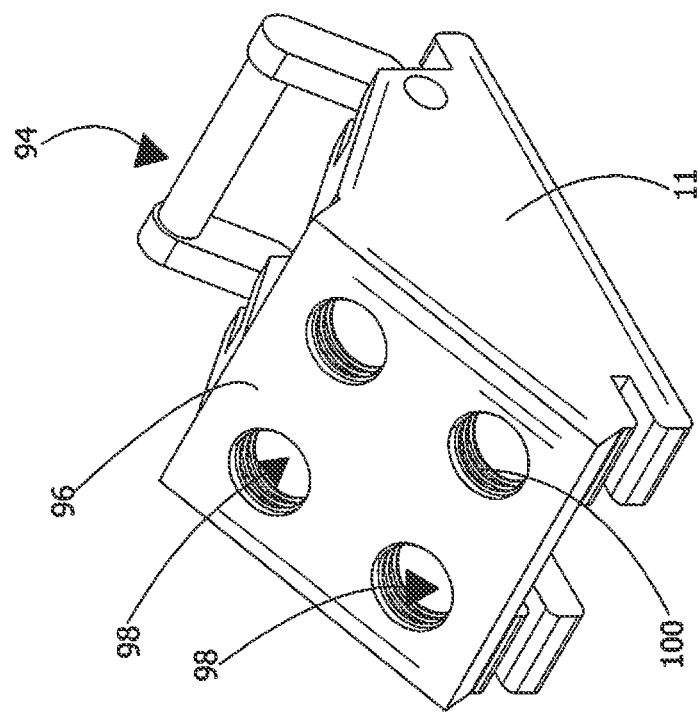
FIG. 11 is a perspective in-use view of an embodiment of the disclosure showing a cargo strap attached to a D-ring.
Figure 10:
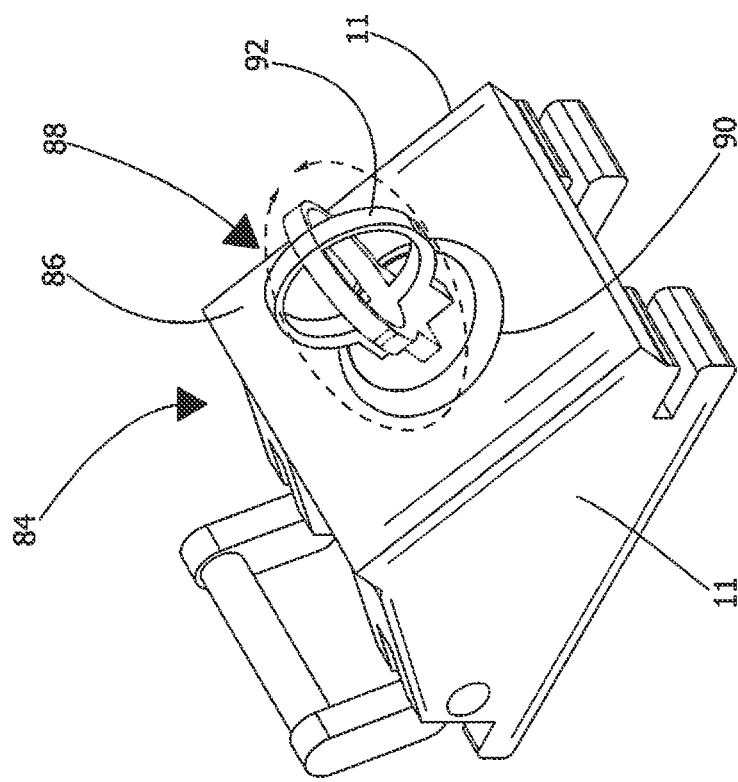
FIG. 10 is a cross sectional view taken along line 10-10 of FIG. 9 of an embodiment of the disclosure.
Figure 12:
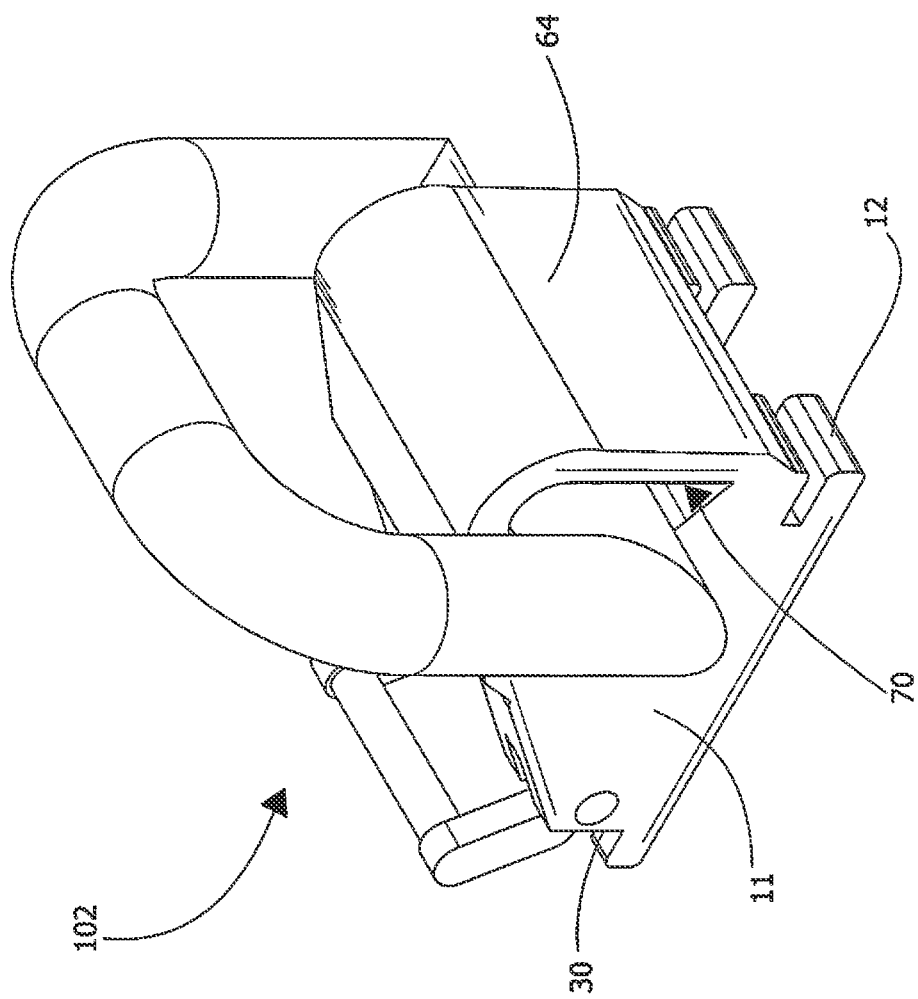
FIG. 12 is a perspective in-use view of an embodiment of the disclosure showing cargo being secured to a cargo trailer.

In an alternative embodiment 84 shown in FIG. 5, a panel 86 is coupled to the top side 34 of each of the pair of track anchors 11 and a swivel 88 is rotatably integrated into the panel 86. The swivel 88 includes a base 90 rotatably integrated into the panel 86 and a ring 92 extending away from the base 90 to facilitate the cargo strap 74 to be coupled to the ring 92. In an alternative embodiment 94 shown in FIG. 6, a panel 96 is coupled to the top side 34 of each of the pair of track anchors 11 and the panel 96 has a plurality of holes 98 each extending through the panel 96. Each of the plurality of holes 98 has a bounding surface 100 that is threaded for accommodating a threaded fastener. In an alternative embodiment 102 shown in FIG. 7, the retainer 64 is oriented such that the tunnel 70 defined by the pair of outward panels 68 of the retainer 64 is oriented to extend perpendicular to extending between the front side 30 and the back side 32 of the pair of track anchors 11.

In use, the pair of track anchors 11 is each seated in the respective pair of the attachment holes 16 in in the cargo track 12 such that locking lever 46 secures the pair of track anchors 11 to the cargo track 12. The cargo strap 74 is attached to the D-ring 72 and the cargo strap 74 is tightened over the cargo 76 for securing the cargo. Furthermore, employing the pair of track anchors 11 to secure the cargo strap 74 rather than employing a single track anchor, as is the common practice with cargo tracks, inhibits the pair of track anchors 11 from tipping laterally due to tension on the cargo strap 74 when the cargo strap extends laterally away from the D-ring 72. In this way the cargo track 12 is inhibited from being bent or deformed by the lateral forces applied to the pair of track anchors 11. As is most clearly shown in FIG. 12, two or more of the pairs of track anchors 11 can be positioned at desired locations along the cargo track 12 to facilitate the cargo strap 74 to be routed through each D-ring 72 associated with each of the two or more of the pairs of track anchors 11 to facilitate a ratcheting mechanism 104 of the cargo strap 74 to be remotely located with respect to the cargo 76. In this way the ratcheting mechanism 104 is easily accessible and can be manipulated in a manner that is unimpeded by the cargo 76.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cargo strap securing assembly for securing a load to a transport trailer, said assembly comprising:
   a cargo track being attached to a cargo trailer, said cargo track having a plurality of attachment holes being spaced apart from each other and being distributed along a full length of said cargo track, each of said plurality of attachment holes having a bounding edge;
   a pair of track anchors, each of said pair of track anchors having a pair of engagement elements being integrated into said track anchors, each of said pair of track anchors being insertable into a respective one of an adjacent pair of said attachment holes in said cargo track such that each of said engagement elements in each of said pair of track anchors receives said cargo track for retaining each of said track anchors in said respective engagement element;
   a locking lever being pivotally coupled between said pair of track anchors, said locking lever defining a respective one of said engagement elements in each of said track anchors, said locking lever being biased into a locking condition for retaining said cargo track in each of said engagement elements, said locking lever being urgeable into an unlocked condition to facilitate said cargo track to be removed from said engagement elements;
   a retainer being coupled to and extending upwardly from said pair of track anchors;
   a D-ring extending through said retainer such that said D-ring is attached to said pair of track anchors thereby facilitating a cargo strap to be attached to said D-ring for tightening said cargo strap around cargo positioned on said cargo trailer to secure said cargo on said cargo trailer,
   wherein said bounding edge of each of said plurality of attachment holes in said cargo track has a forward side and a rear side, each of said plurality of attachment holes being elongated between said forward side and said rear side;
   wherein each of said track anchors has a bottom side, a front side, a back side and a top side;
   wherein said front side of each of said track anchors has a first portion being perpendicularly oriented with said bottom side and a second portion angling rearwardly between said first portion and said top side;
   wherein said top side slopes downwardly between said second portion and said back side;
   wherein said back side has a back slot extending toward said front side such that said back slot defines a respective one of said engagement elements, said back slot being positioned closer to said bottom side than said top side, said back slot insertably receiving said rear side of said bounding edge of said respective pair of attachment holes;
   wherein said front side of each of said track anchors has a foot extending forwardly from said first portion of said front side, said foot being aligned with said bottom side;
   wherein said front side of each of said track anchors has a front slot extending toward said back side, said front slot extending through said foot on said front side; and
   wherein said locking lever includes
      a pair of locks which each includes a first lobe being oriented at an angle with a second lobe, said first lobe associated with each of said locks extending into said front slot in said front side of a respective one of said track anchors such that said first lobe associated with each of said locks is spaced above said foot on said front side of said respective track anchor having said second lobe associated with each of said track anchors angling upwardly and forwardly on said front side, and
      a bar extending between said second lobe associated with each of said locks thereby facilitating said bar to be manipulated to urge locks into said unlocked position.

2. The assembly according to claim 1, wherein a lower edge of said first lobe lies on a plane oriented parallel to a top surface of said foot when said locks are in a locked position thereby facilitating said forward side of said bounding edge of said respective attachment hole to be positioned between said first lobe and said foot.

3. The assembly according to claim 1, wherein said first lobe angles upwardly from said foot having said second lobe being directed toward said second portion of said front side of said respective track anchor when said locks are in an unlocked position.

4. A cargo strap securing assembly for securing a load to a transport trailer, said assembly comprising:
   a cargo track being attached to a cargo trailer, said cargo track having a plurality of attachment holes being spaced apart from each other and being distributed along a full length of said cargo track, each of said plurality of attachment holes having a bounding edge;
   a pair of track anchors, each of said pair of track anchors having a pair of engagement elements being integrated into said track anchors, each of said pair of track anchors being insertable into a respective one of an adjacent pair of said attachment holes in said cargo track such that each of said engagement elements in each of said pair of track anchors receives said cargo track for retaining each of said track anchors in said respective engagement element;

a locking lever being pivotally coupled between said pair of track anchors, said locking lever defining a respective one of said engagement elements in each of said track anchors, said locking lever being biased into a locking condition for retaining said cargo track in each of said engagement elements, said locking lever being urgeable into an unlocked condition to facilitate said cargo track to be removed from said engagement elements;

a retainer being coupled to and extending upwardly from said pair of track anchors; and a D-ring extending through said retainer such that said D-ring is attached to said pair of track anchors thereby facilitating a cargo strap to be attached to said D-ring for tightening said cargo strap around cargo positioned on said cargo trailer to secure said cargo on said cargo trailer;

wherein said bounding edge of each of said plurality of attachment holes in said cargo track has a forward side and a rear side, each of said plurality of attachment holes being elongated between said forward side and said rear side;

wherein each of said track anchors has a bottom side, a front side, a back side and a top side;

wherein said front side of each of said track anchors has a first portion being perpendicularly oriented with said bottom side and a second portion angling rearwardly between said first portion and said top side;

wherein said top side slopes downwardly between said second portion and said back side;

wherein said back side has a back slot extending toward said front side such that said back slot defines a respective one of said engagement elements, said back slot being positioned closer to said bottom side than said top side, said back slot insertably receiving said rear side of said bounding edge of said respective pair of attachment holes;

wherein said front side of each of said track anchors has a foot extending forwardly from said first portion of said front side, said foot being aligned with said bottom side;

wherein said front side of each of said track anchors has a front slot extending toward said back side, said front slot extending through said foot on said front side; and wherein said locking lever includes
a pair of locks which each includes a first lobe being oriented at an angle with a second lobe, said first lobe associated with each of said locks extending into said front slot in said front side of a respective one of said track anchors such that said first lobe associated with each of said locks is spaced above said foot on said front side of said respective track anchor having said second lobe associated with each of said track anchors angling upwardly and forwardly on said front side, and a pin extending through each of said anchor locks and through said first lobe associated with each of said locks for pivotally retaining each of said locks in said front slot in said front side of said respective anchor track.

5. The assembly according to claim 4, wherein said locking lever includes a biasing member being wrapped around said pin, said biasing member biasing said pin to rotate in a first direction thereby biasing said locks into said locked position, said pin being rotatable in a second direction when said bar is urged upwardly to urge said locks into said unlocked position.

6. The assembly according to claim 1, wherein said retainer includes a lower panel and a pair of outward panels each angling toward each other from said lower panel such that said retainer defines a tunnel which has a triangular shape, said lower panel being bonded to said top side of each of said pair of track anchors such that said tunnel is oriented to extend along an axis extending between said front side and said back side of each of said track anchors.

7. The assembly according to claim 6, wherein said D-ring has a first member extending between opposing ends of a second member which is curved into a U-shape, said first member extending through an opening defined by said pair of outward panels of said retainer thereby facilitating said cargo strap to be attached to said second member.

8. A cargo strap securing assembly for securing a load to a transport trailer, said assembly comprising:

a cargo track being attached to a cargo trailer, said cargo track having a plurality of attachment holes being spaced apart from each other and being distributed along a full length of said cargo track, each of said plurality of attachment holes having a bounding edge, said bounding edge having a forward side and a rear side, each of said plurality of attachment holes being elongated between said forward side and said rear side;

a pair of track anchors, each of said pair of track anchors having a pair of engagement elements being integrated into said track anchors, each of said pair of track anchors being insertable into a respective one of an adjacent pair of said attachment holes in said cargo track such that each of said engagement elements in each of said pair of track anchors receives said cargo track for retaining each of said track anchors in said respective engagement element, each of said track anchors having a bottom side, a front side, a back side and a top side, said front side of each of said track anchors having a first portion being perpendicularly oriented with said bottom side and a second portion angling rearwardly between said first portion and said top side, said top side sloping downwardly between said second portion and said back side, said back side having a back slot extending toward said front side such that said back slot defines a respective one of said engagement elements, said back slot being positioned closer to said bottom side than said top side, said back slot insertably receiving said rear side of said bounding edge of said respective pair of attachment holes, said front side of each of said track anchors having a foot extending forwardly from said first portion of said front side, said foot being aligned with said bottom side, said front side of each of said track anchors having a front slot extending toward said back side, said front slot extending through said foot on said front side;

a locking lever being pivotally coupled between said pair of track anchors, said locking lever defining a respective one of said engagement elements in each of said track anchors, said locking lever being biased into a locking condition for retaining said cargo track in each of said engagement elements, said locking lever being urgeable into an unlocked condition to facilitate said cargo track to be removed from said engagement elements, said locking lever including:

a pair of locks each including a first lobe being oriented at an angle with a second lobe, said first lobe associated with each of said locks extending into said front slot in said front side of a respective one of said track anchors such that said first lobe associated with each of said locks is spaced above said foot on said front side of said respective track anchor having said second lobe associated with each of said track anchors angling upwardly and forwardly on said front side, a lower edge of said first lobe lying on a plane oriented parallel to a top surface of said foot when said locks are in a locked position thereby facilitating said forward side of said bounding edge of said respective attachment hole to be positioned between said first lobe and said foot, said first lobe angling upwardly from said foot having said second lobe being directed toward said second portion of said front side of said respective track anchor when said locks are in an unlocked position;

a pin extending through each of said anchor locks and through said first lobe associated with each of said locks for pivotally retaining each of said locks in said front slot in said front side of said respective anchor track;

a bar extending between said second lobe associated with each of said locks thereby facilitating said bar to be manipulated to urge locks into said unlocked position; and a biasing member being wrapped around said pin, said biasing member biasing said pin to rotate in a first direction thereby biasing said locks into said locked position, said pin being rotatable in a second direction when said bar is urged upwardly to urge said locks into said unlocked position;

a retainer being coupled to and extending upwardly from said pair of track anchors, said retainer including a lower panel and a pair of outward panels each angling toward each other from said lower panel such that said retainer defines a tunnel which has a triangular shape, said lower panel being bonded to said top side of each of said pair of track anchors such that said tunnel is oriented to extend along an axis extending between said front side and said back side of each of said track anchors; and a D-ring extending through said retainer such that said D-ring is attached to said pair of track anchors thereby facilitating a cargo strap to be attached to said D-ring for tightening said cargo strap around cargo positioned on said cargo trailer to secure said cargo on said cargo trailer, said D-ring having a first member extending between opposing ends of a second member which is curved into a U-shape, said first member extending through an opening defined by said pair of outward panels of said retainer thereby facilitating said cargo strap to be attached to said second member.

9. The assembly according to claim 8, further comprising:
a panel being coupled to said top side of each of said pair of track anchors; and
a swivel being rotatably integrated into said panel, said swivel including a base being rotatably integrated into said panel and a ring extending away from said base to facilitate said cargo strap to be coupled to said ring.

10. The assembly according to claim 8, further comprising a panel being coupled to said top side of each of said pair of track anchors, said panel having a plurality of holes each extending through said panel, each of said plurality of holes having a bounding surface being threaded for accommodating a threaded fastener.

11. The assembly according to claim 8, wherein said retainer is oriented such that said tunnel defined by said pair of outward panels of said retainer is oriented to extend perpendicular to extending between said front side and said back side of said pair of track anchors.

* * * * *